US007688698B2

(12) United States Patent
Tsukagoshi et al.

(10) Patent No.: US 7,688,698 B2
(45) Date of Patent: Mar. 30, 2010

(54) HOLOGRAPHIC RECORDING METHOD AND APPARATUS

(75) Inventors: Takuya Tsukagoshi, Sagamihara (JP); Jiro Yoshinari, Tokyo (JP); Hideaki Miura, Tokyo (JP); Tetsuro Mizushima, Moriguchi (JP)

(73) Assignee: TDK Corporation, Tokyo (JP)

( * ) Notice: Subject to any disclaimer, the term of this patent is extended or adjusted under 35 U.S.C. 154(b) by 494 days.

(21) Appl. No.: 10/568,750

(22) PCT Filed: Aug. 20, 2004

(86) PCT No.: PCT/JP2004/011975

§ 371 (c)(1),
(2), (4) Date: Feb. 21, 2006

(87) PCT Pub. No.: WO2005/022522

PCT Pub. Date: Mar. 10, 2005

(65) Prior Publication Data
US 2006/0280094 A1    Dec. 14, 2006

(30) Foreign Application Priority Data
Aug. 28, 2003 (JP) .............................. 2003-304833

(51) Int. Cl.
*G11B 7/00* (2006.01)
*G03H 1/04* (2006.01)

(52) U.S. Cl. ..................... 369/103; 369/44.26; 359/35

(58) Field of Classification Search ................. 369/103, 369/116, 112.01, 112.04, 44.26, 44.29; 359/11, 359/21, 35
See application file for complete search history.

(56) References Cited

U.S. PATENT DOCUMENTS

| 5,416,616 | A  | * | 5/1995  | Jenkins et al. | ............... 369/103 |
| 5,465,248 | A  | * | 11/1995 | Fuji | ....................... 369/112.01 |
| 6,972,982 | B2 | * | 12/2005 | Cho | ............................ 365/125 |
| 7,088,481 | B2 | * | 8/2006  | Edwards | ....................... 359/11 |
| 2005/0237896 | A1 | * | 10/2005 | Tachibana et al. | ............ 369/103 |

FOREIGN PATENT DOCUMENTS

| JP | A-06-195793   | 7/1994  |
| JP | A-06-325381   | 11/1994 |
| JP | A 11-237829   | 8/1999  |
| JP | A 2002-183975 | 6/2002  |

* cited by examiner

*Primary Examiner*—Peter Vincent Agustin
*Assistant Examiner*—Kim-Kwok Chu
(74) *Attorney, Agent, or Firm*—Oliff & Berridge, PLC

(57) ABSTRACT

When recording on a holographic recording medium by using a recording beam, the time required for an asking servo control to recover is reduced to increase the data transfer rate. In the holographic recording apparatus 10, a laser beam from a laser light source 16 is formed into a collimated beam having an expanded beam diameter and then is divided into an object beam and a reference beam. The divided object beam is modulated according to information to be recorded, and these object and reference beams are made incident on the reflective surface of a rotating polygon mirror 18, while maintaining collimated beam shapes and being adjacent to each other, through a condenser lens 24 having a focal point behind the reflective surface of the polygon mirror 18. The object and reference beams are made incident on the holographic recording medium 12 moving in the same direction as their scanning direction with angles different from each other so as to interfere with each other within the holographic recording medium 12.

8 Claims, 8 Drawing Sheets

Trajectories of recording position ($\theta=0\sim10°$)

Relationship between rotation angle and recording position

HOLOGRAPHIC RECORDING METHOD AND APPARATUS

TECHNICAL FIELD

The present invention relates to a holographic recording method and an apparatus for recording information into a holographic recording medium as an interference fringe formed by an object beam and a reference beam.

BACKGROUND ART

A holographic recording method described in Japanese Patent Laid-Open Publication No. 2002-183975, for example, uses a recording beam comprising a set of an object beam and a reference beam to perform recording and reproducing. In this case, a tracking mirror moves the recording beam in synchronization with a rotating holographic recording medium in the same direction as the recording medium, that is, an asking servo control is performed.

In the holographic recording method and apparatus described in the above Japanese Patent Laid-Open Publication No. 2002-183975, although the recording beam is moved by the tracking mirror in synchronization with the recording medium, it is impossible for the laser beam to perform recording or reproducing during the recovery time of this tracking mirror.

Accordingly, there has been a problem in that the recovery time of this tracking mirror, i.e., the time required for the asking servo control to recover, is one of factors to degrade the data transfer rate.

DISCLOSURE OF THE INVENTION

The invention addresses the above problem in the conventional technology, and an object of the invention is to provide a holographic recording method and an apparatus that can reduce the recovery time of an asking servo control to substantially zero and can dramatically increase the data transfer rate.

The above-described objectives are achieved by the following aspects of embodiments.

(1) A method of holographic recording, comprising the steps of: forming a laser beam into a collimated beam having an expanded diameter and then dividing the diameter into an object beam and a reference beam; modulating the divided object beam according to information to be recorded; making these object and reference beams incident on the reflective surface of a rotating polygon mirror, while maintaining collimated beam shapes and being adjacent to each other, through a condenser lens having a focal point behind the reflective surface of the polygon mirror; and moving the object and reference beams reflected on the reflective surface in a scanning direction determined by the angle change of the reflective surface, and meanwhile making the object and reference beams incident on the holographic recording medium moving in the same direction as the scanning direction with angles different from each other so as to interfere with each other within the holographic recording medium.

(2) A method of holographic recording, comprising the steps of: driving a holographic recording medium, and meanwhile irradiating a first recording beam comprising one recording beam set from among multiple recording beam sets in the recording time while moving substantially in synchronization with and in the same direction as the holographic recording medium, the one recording beam set comprising an object beam and a reference beam forming an interference fringe on the holographic recording medium; bringing the first recording beam back to an original position in the following recovery time; and irradiating at least a second recording beam comprising one recording beam set from among the remaining multiple recording beam sets in the recovery time of the first recording beam while moving substantially in synchronization with and in the same direction as the holographic recording medium.

(3) The method of holographic recording according to (2), wherein the multiple recording beam sets are irradiated to the holographic recording medium while being alternately offset either in the driving direction of the holographic recording medium or in the direction orthogonal to the driving direction.

(4) A holographic recording apparatus comprising: a recording medium driver for driving a holographic recording medium capable of recording an interference fringe of incident object and reference beams; a laser light source; a beam expander for expanding a laser beam emitted from the laser light source to form a collimated beam having an expanded beam diameter; a collimated beam divider for dividing the beam diameter of the collimated beam expanded by the beam expander; a polygon mirror that is freely rotatable; a condenser lens having a focal point that allows an incident collimated beam to be focused behind the reflective surface of the polygon mirror; an object optical system and a reference optical system for guiding one of the divided collimated beams as an object beam and the other as a reference beam to the condenser lens as incident collimated beams; a scanning optical system for guiding the object and reference beams reflected on the reflective surface of the rotating polygon mirror to the holographic recording medium while controlling the scanning direction determined by the rotation of the polygon mirror to match the moving direction of the holographic recording medium; and a spatial light modulator, disposed in the object optical system, for modulating the object beam according to information to be recorded, wherein the object optical system and the reference optical system are configured so that the object and reference beams are integrated so as to maintain collimated beam shapes and be adjacent to each other without overlapping, and are made incident on the condenser lens with substantially the same beam shape as the collimated beam.

(5) The holographic recording apparatus according to (4), wherein the scanning optical system is configured as a 4f-optical system.

(6) The holographic recording apparatus according to (4), wherein the scanning optical system includes an f-θ lens which refracts the object and reference beams reflected by the polygon mirror such that when an angle between an optical axis of the polygon mirror and a central optical axis of the f-θ lens is θ, the refracted object and reference beams are parallel to the central optical axis of the f-θ lens along an optical axis whose distance from the central optical axis of the f-θ lens is proportional to the θ.

(7). The holographic recording apparatus according to (6), wherein a relay lens is disposed between the f-θ lens in the scanning optical system and the polygon mirror, the relay lens focusing the object and reference beams reflected from the polygon mirror to the focal point of the f-θ lens.

(8) A holographic recording apparatus comprising: a recording medium driver for driving a holographic recording medium capable of recording an interference fringe of incident object and reference beams; a laser light source; recording beam optical systems for guiding multiple recording beam sets separately to the holographic recording medium and whose number is the same as the number of recording beam sets, each of the recording beam sets comprising an object beam and a reference beam both formed by dividing a laser beam emitted from the laser light source; a spatial light modulator, disposed in an object optical system that guides the object beam in each of the recording beam optical systems, for modulating the object beam according to information to be recorded; a light shutter, disposed in a reference optical system that guides the reference beam in each of the recording beam optical systems, for blocking the reference beam independently; and a controller for controlling the recording medium driver, each of the light shutters, and each of the spatial light modulators, wherein: the recording beam optical systems are sequentially provided with a first tracking mirror, a second tracking mirror, and so on, the first tracking mirror reflecting a first recording beam in a first recording beam optical system from among the multiple recording beam optical systems and moving the reflection point of the first recording beam, the second tracking mirror reflecting a second recording beam, which is guided by a second recording beam optical system from among the multiple recording beam optical systems, and the first recording beam, which is reflected from the first tracking mirror, toward the holographic recording medium and moving the reflection points of the second recording beam and the first recording beam in parallel with the reflection point on the first tracking mirror; the recording beam optical systems each are configured so that the recording beams are alternately offset at least either in a driving direction of the holographic recording medium or in a direction orthogonal thereto and are made incident on the holographic recording medium; and the controller can control each of the tracking mirrors and controls each of the tracking mirrors so that sequential recording on the holographic recording medium can be performed by the recording beams and one of the recording beams can be moved in the driving direction of the holographic recording medium in synchronization therewith in the period of recording while another recording beam is moving in the direction opposite to the driving direction, and controls the light shutter in a recording beam optical system of the recording beam not in recording operation to block an optical path of the recording beam optical system.

BEST MODE FOR CARRYING OUT THE INVENTION

According to the best embodiment of the invention, the diameter of a laser beam is divided to form an object beam and a reference beam, which are made incident on a polygon mirror. The reflection from the polygon mirror is synchronized with the driving direction of a holographic recording medium and the object beam is made interfere with the reference beam on the holographic recording medium, thereby achieving the object of reducing the recovery time of an asking servo control to nearly zero.

Figure 1:
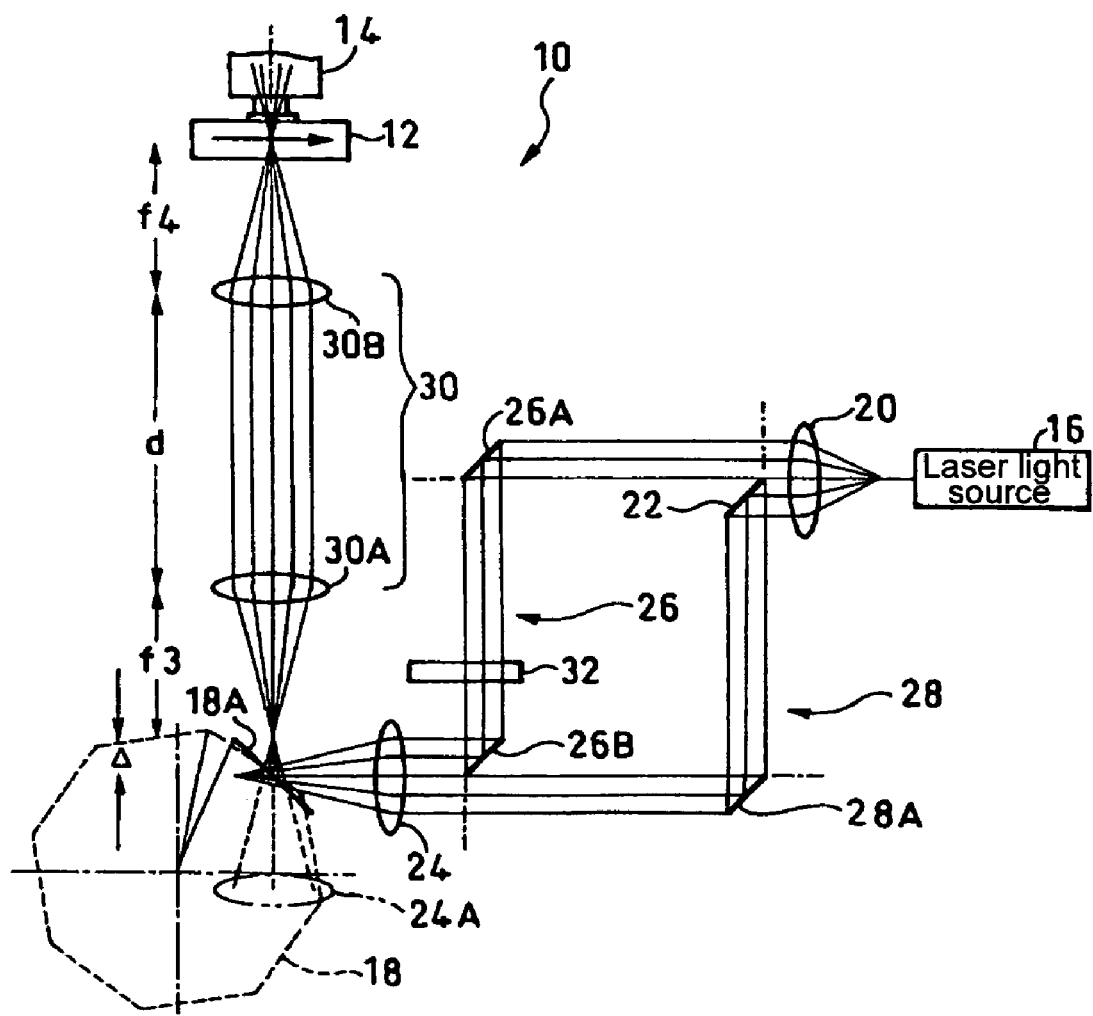
FIG. 1 is an optical system diagram of the holographic recording apparatus according to a first embodiment of the invention.

A holographic recording apparatus 10 according to a first embodiment of the invention, shown in FIG. 1, will now be described in detail.

The holographic recording apparatus 10 records an interference fringe formed by incident object and reference beams into a holographic recording medium 12 capable of recording the interference fringe, in such a way that: while a recording medium driver 14 is driving the holographic recording medium 12, a laser beam from a laser light source 16 is reflected by a polygon mirror 18, and the reflected scan beam is irradiated in synchronization with the driving of the holographic recording medium 12.

The holographic recording apparatus 10 comprises: a beam expander 20 for forming a laser beam emitted from the laser light source 16 to a collimated beam having an expanded diameter; a collimated beam divider 22 for dividing the shape of the collimated beam expanded by the beam expander 20; a condenser lens 24 having a focal point that allows an incident collimated beam to be focused behind the reflective surface of the polygon mirror 18; an object optical system 26 and a reference optical system 28 each for guiding the divided collimated beams, one as an object beam and the other as a reference beam, to the condenser lens 24 as an incident collimated beam; a scanning optical system 30 for guiding the object and reference beams reflected on the reflective surface of the rotating polygon mirror 18 to the holographic recording medium 12 while making the scanning direction and the moving direction of the holographic recording medium 12 matched with each other by the rotation of the polygon mirror 18; and a spatial light modulator 32 which is disposed in the object optical system 26 and modulates the object beam according to information to be recorded.

The object optical system 26 and the reference optical system 28 are configured so that the object and reference beams are integrated so as to maintain collimated beam shapes and be adjacent to each other without overlapping, and are made incident on the condenser lens 24 with substantially the same beam shape as the collimated beam shape before being divided.

The collimated beam divider 22 comprises a mirror that reflects part of the beam shape of the laser beam, the diameter of which has been expanded by the beam expander 20, at a right angle. The object optical system 26 comprises: a mirror 26A reflecting the remaining shape of the laser beam that has not been divided by the collimated beam divider 22; the spatial light modulator 32 through which the laser beam reflected on the mirror 26A passes; and a mirror 26B reflecting the laser beam, which is the object beam modulated by the spatial light modulator 32, toward the condenser lens 24.

The reference optical system 28 guides the laser beam reflected by the collimated beam divider 22 to the condenser lens 24 as a reference beam and is configured with a mirror 28A. The mirror 28A reflects the laser beam reflected by the collimated beam divider 22, which is a mirror, toward the condenser lens 24 so as to be parallel to and adjacent to the object beam without overlapping.

Figure 2:
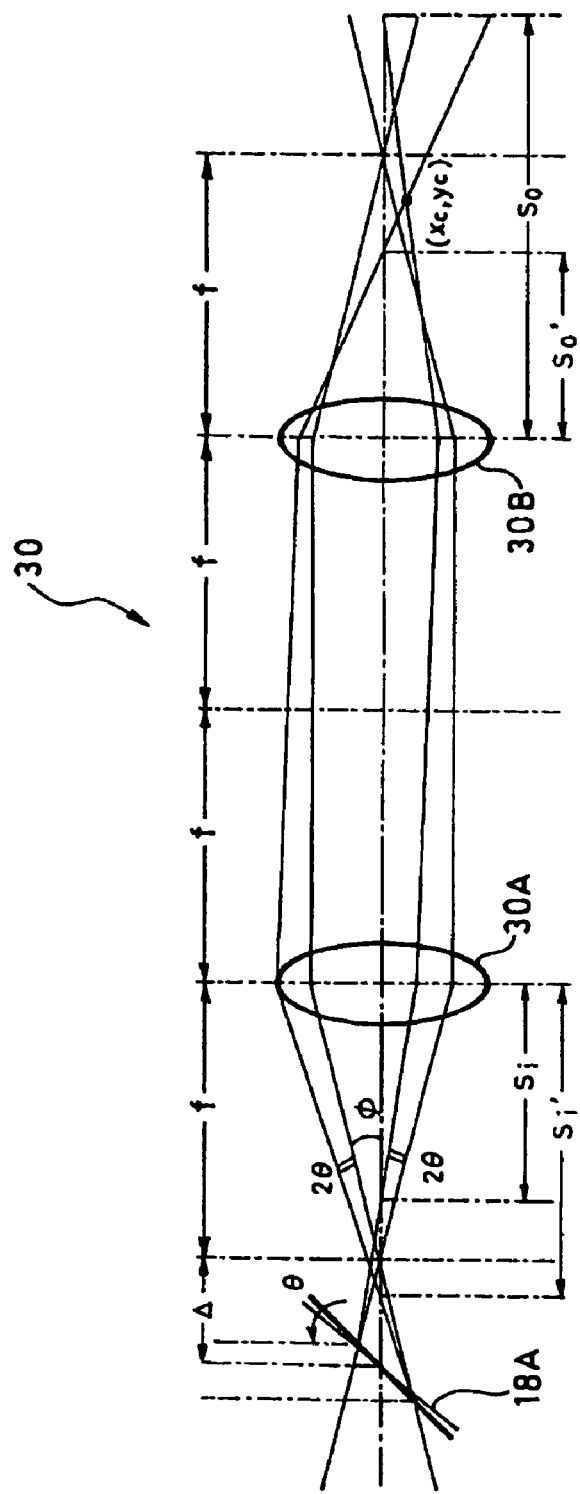
FIG. 2 is an enlarged optical arrangement diagram illustrating a scanning optical system in the first embodiment.

The scanning optical system 30 is configured as a so-called 4f optical system. As shown in FIG. 2, the scanning optical system 30 configured as this 4f optical system includes lenses 30A and 30B both having an identical focal length f, disposed with an interval of 2f. The lens 30A located on the side of the polygon mirror 18 is disposed so as to have a confocal point with the virtual image 24A of the condenser lens 24, formed behind the polygon mirror 18 when the reflective surface 18A of the polygon mirror 18 is positioned at an angle of 45° to the central optical axis of the condenser lens 24.

In the holographic recording apparatus 10 according to the embodiment, the object and reference beams have their shapes obtained by dividing the diameter of the laser beam expanded by the beam expander 20. The object beam, one of the two divided beams, is modulated by the spatial light modulator 32 according to information to be recorded, and then is formed, together with the reference beam, to substantially the same beam shape as the one before being divided, which is made incident on the condenser lens 24.

The condenser lens 24 is disposed so that its virtual image 24A has a confocal point with the lens 30A in the scanning optical system 30 when the reflective surface 18A of the polygon mirror 18 is positioned at an angle of 45° to the central optical axis of the condenser lens 24. Therefore, when the reflective surface 18A of the polygon mirror 18 is positioned at an angle of 45° to the central optical axis of the condenser lens 24, the object and reference beams from the condenser lens 24 are reflected on the reflective surface 18A toward the lens 30A and are formed by the lens 30A to a collimated beam.

Since, as described above, the scanning optical system 30 is formed as the 4f optical system, the collimated beam is incident on the lens 30B as it is and then is incident at a predetermined position on the holographic recording medium 12. At this time, since the object and reference beams, while each maintaining the divided collimated beam shape, are incident on the holographic recording medium 12 at angles different from each other, an interference fringe is recorded on the holographic recording medium 12.

Next, the deflections of the object and reference beams, which are produced when the reflective surface 18A of the polygon mirror 18 tilts from the middle point where it is positioned at an angle of 45° to the central optical axis, will be described with reference to FIG. 2.

As a particular case, the case when f3=f4=d/2 will be considered. This corresponds to a so-called 4f optical system characterized in that: the lateral magnification of an image transmitted is constant; and even if the positions of an object and its image change on the optical axis, their sum (corresponding to $s_i+s_o$ in FIG. 2) is constant and equal to 2f ($s_i+s_o=$2f=constant). If the polygon mirror 18 rotates counterclockwise by an angle of θ about the point located at a distance of f+Δ from the lens 30A on the optical axis thereof, both the object and reference beams are deflected by an angle of 2θ. If the distances from the points where the deflected object and reference beams traverse the optical axis to the principal point of the lens 30A are denoted $s_i$ and $s_i'$, respectively, the relationship among these distances, φ (an angle between the beam before being deflected and the optical axis), Δ, and f can be obtained from geometrical considerations as follows.

$$s_i = f - (\tan\phi - \tan\Psi)/\{\tan\Psi(1+\tan\phi)\}\Delta$$

$$s_i' = f + (\tan\Psi' - \tan\phi)/\{\tan\Psi'(1-\tan\phi)\}\Delta$$

where, $\Psi \equiv \phi - 2\theta$

If, assuming that the F-number of a lens (numerical aperture) is large, the thin lens and paraxial approximations are applied, then the positions of the points where the object and reference beams traverse the optical axis again behind the lens 30B (distances from the principal point of the lens 30B) are given by the following equations.

$$s_o = f - (\tan\phi - \tan\Psi)/\{\tan\Psi(1+\tan\phi)\}\Delta$$

$$s_o' = f + (\tan\Psi' - \tan\phi)/\{\tan\Psi'(1-\tan\phi)\}\Delta$$

Further, from a geometrical consideration, the point ($x_c$, $y_c$) where the object and reference beams intersect with each other behind the lens 30B is obtained by the following equations.

$$x_c = (s_o \tan\Psi + s_o'\tan\Psi')/(\tan\Psi + \tan\Psi')$$

$$y_c = (s_o' - s_o)\tan\Psi\tan\Psi'$$

Figure 3:
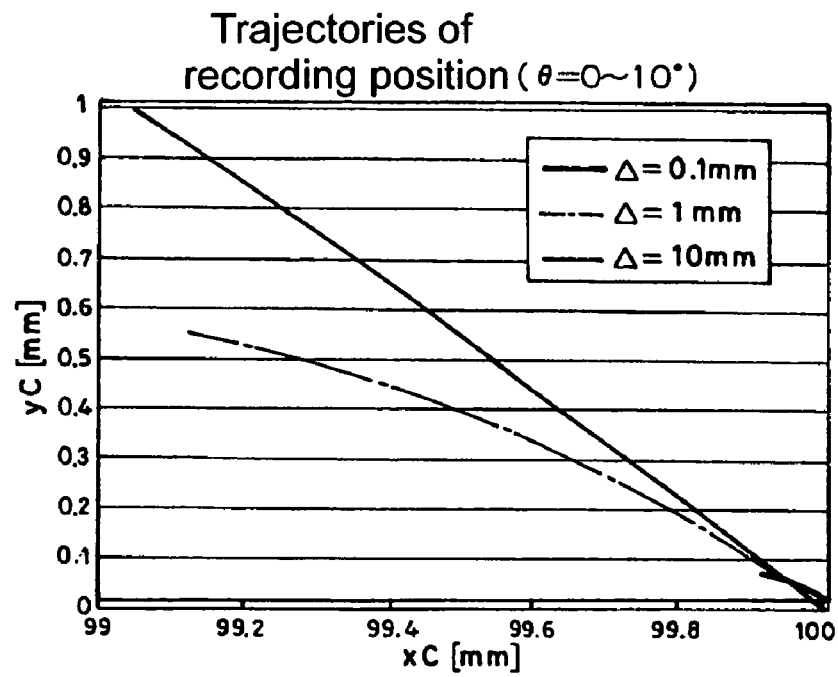
FIG. 3 is a diagram illustrating a relationship between the moving range of recording position on a holographic recording medium and the position of a recording beam incident on a polygon mirror in the first embodiment.
Figure 4:
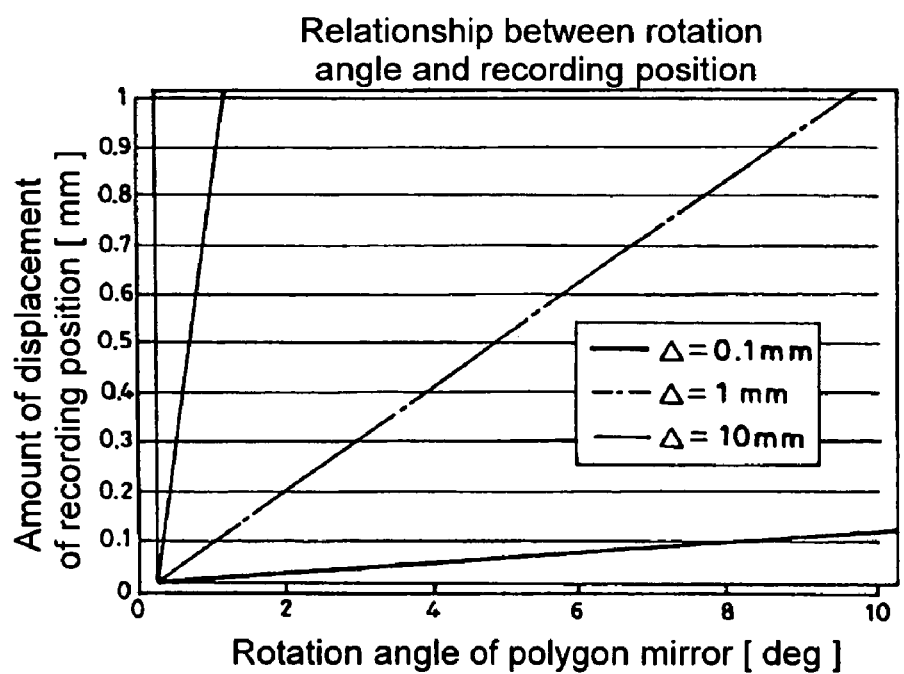
FIG. 4 is a diagram illustrating a relationship between the rotation angle of the polygon mirror and the amount of displacement of the recording position in relation to the position of a recording beam incident on the polygon mirror in the first embodiment.

FIG. 3 and FIG. 4 illustrate the variation of the point ($x_c$, $y_c$) with respect to the rotation angle θ of the polygon mirror.

FIG. 3 illustrates the range in which the point ($x_c$, $y_c$) moves when the mirror is rotated counterclockwise from θ=0° to 10°, where θ=0° is defined as a condition in which the angle between the optical axis and reflective surface of the polygon mirror 18 is 45°. In this illustration, the focal length f of both the lenses 30A and 30B is assumed to be 100 mm (f=100 mm), and, in addition, φ=30° and Δ=0.1 mm, 1 mm, 10 mm are also assumed. As shown in FIG. 3, the recording position at which the object and reference beams intersect with each other in the recording medium can be varied in a substantially linear fashion by changing Δ, i.e., the setting position of the polygon mirror 18. This characteristic can be used for, for example, a tracking control with respect to the movement of a recording medium and a position control in the track direction.

FIG. 4 is a diagram obtained by plotting the integral displacements of the recording positions against the rotation angle θ of the polygon mirror, wherein the integral displacement is defined by an amount of displacement along each curve in FIG. 3. Once a desired movement pattern is determined with respect to the recording positions in a recording medium, a rotational pattern of the polygon mirror is determined according to FIG. 3 and FIG. 4 and further the number of mirror planes, size, and rotational speed of the polygon mirror are determined so as to obtain the rotational pattern.

Figure 5:
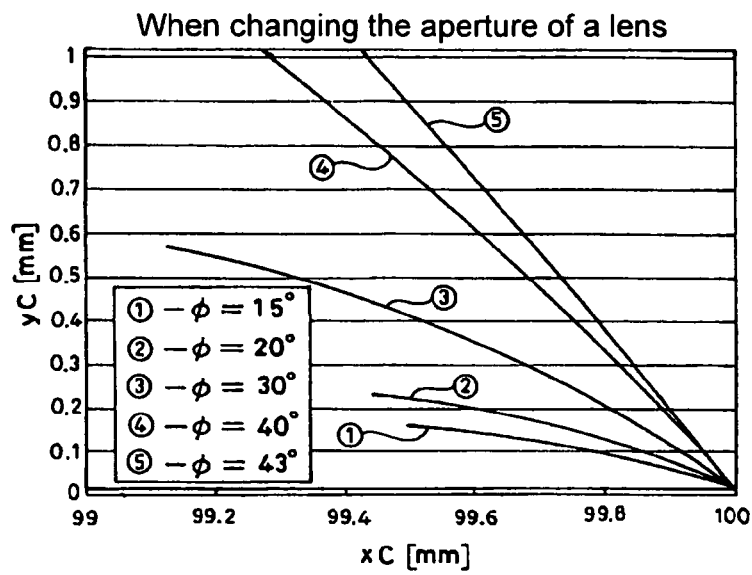
FIG. 5 is a diagram illustrating a relationship between the amount of displacement of the recording position on the holographic recording medium and the amount of variation of the aperture of a lens.

According to FIG. 3, by changing Δ, it is possible to control the movable range of the position to which the recording or reproducing beam is irradiated, but the moveable direction does not change. Therefore, the aperture of a lens, i.e., the numerical aperture, is changed, by which the moveable range is obtained as shown in FIG. 5. It is appreciated that, as the angle ϕ is increased from ϕ=15°, the movable direction of the beam changes to a direction remote from the optical axis (x-axis). The position to which the beam is irradiated can thus be controlled not only by the focal length or Δ but also by changing the outer diameter of a lens, which indicates that design flexibility of the polygon mirror is high.

Next, a second embodiment of the scanning optical system 30 in the holographic recording apparatus 10 will be described.

Figure 6:
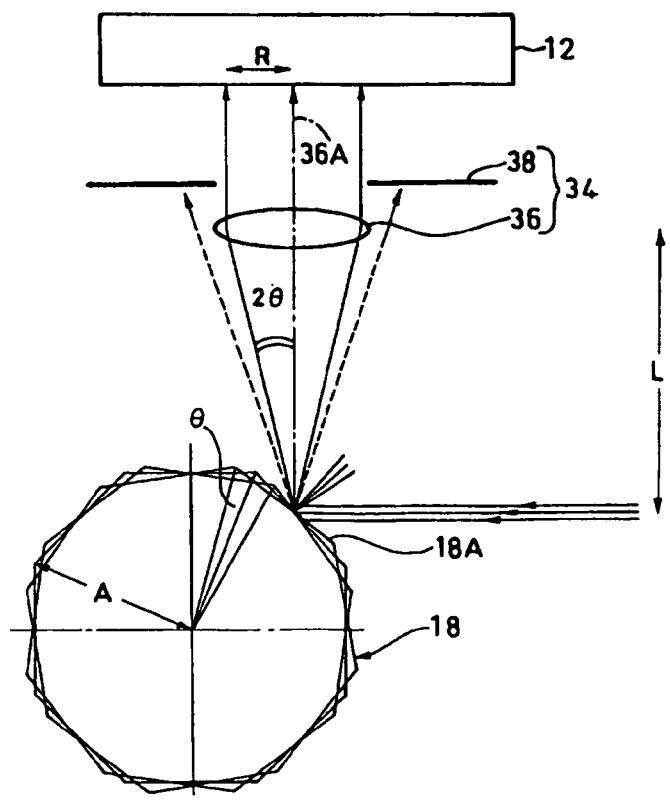
FIG. 6 is an optical arrangement diagram showing the essential part of a second embodiment of the invention.

As shown in FIG. 6, a scanning optical system 34 according to the second embodiment has an f-θ lens 36 and an aperture 38.

When the optical axis of the polygon mirror 18 and the optical axis 36A of the f-θ lens form an angle of θ, the f-θ lens 36 refracts the object and reference beams reflected by the polygon mirror 18 so as to be parallel to the optical axis 36A of the f-θ lens along an optical axis whose distance from the optical axis 36A of the f-θ lens is proportional to the angle θ.

Accordingly, although the reflection angle of the object and reference beams varies depending on the rotation of the polygon mirror 18, the beams incident on the f-θ lens 36 are always incident at right angles to the holographic recording medium 12, and their incident positions correspond to the rotation angle of the reflective surface 18A of the polygon mirror 18.

The aperture 38 is used for blocking the beam that is part of the object and reference beams reflected on the reflective surface 18A of the polygon mirror 18 and is irradiated to the area outside the f-θ lens 36.

The movable range R of the incident position of the beam incident on the holographic recording medium 12 through the f-θ lens, which is measured from the optical axis 36A of the f-θ lens, is determined according to the driving speed of the holographic recording medium 12.

Figure 7:
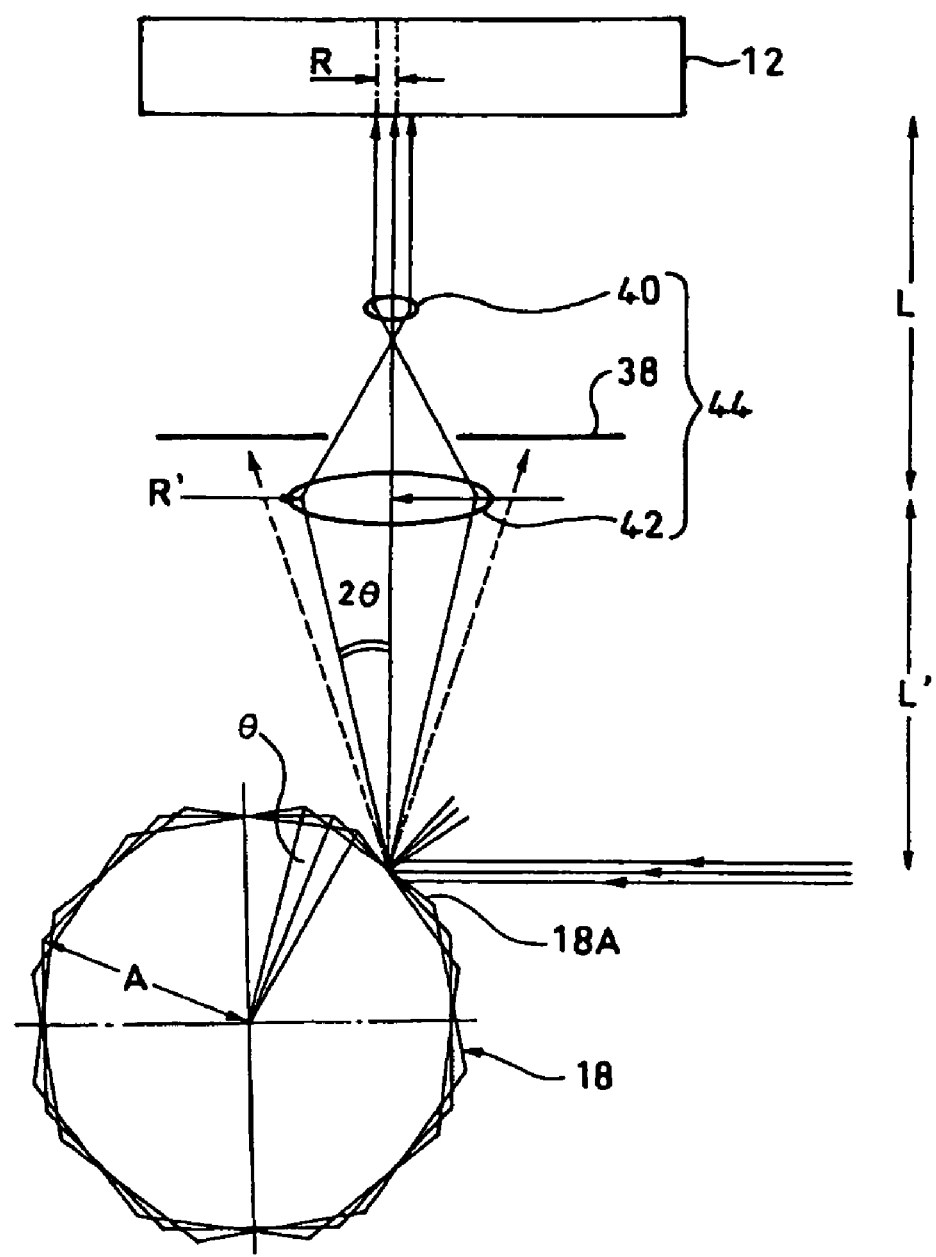
FIG. 7 is an optical arrangement diagram showing the essential part of a third embodiment of the invention.

To reduce the movable range R, as in a third embodiment shown in FIG. 7, a scanning optical system 44 may be configured with a small f-θ lens 40 matching to a small movable range and a relay lens 42 disposed between the f-θ lens 40 and polygon mirror 18.

In this case, if the focal length of the relay lens 42 is denoted f', the distance L' from the polygon mirror 18 is set so as to be larger than the focal length f' of the relay lens 42. The light beam passing through the relay lens 42 is focused at the distance s' that meets the following equation.

$$1/L'+1/s'=1/f'$$

If the focal length f of the f-θ lens 40 is denoted f (<f') and the f-θ lens 40 is disposed at the distance s'+f from the relay lens 42, the position control of the beam irradiated to the holographic recording medium 12 can be performed as in the case in FIG. 6 and, in addition, the movable range can be reduced.

Next, a fourth embodiment of the invention, shown in FIG. 8, will be described.

In a holographic recording apparatus 50 according to the fourth embodiment, two recording beam sets are formed, wherein one recording beam set comprises an object beam and a reference beam that form an interference fringe on the holographic recording medium 12. While driving the holographic recording medium 12, a first recording beam in the two recording beam sets is irradiated while being moved substantially in synchronization with and in the same direction as the holographic recording medium 12 in the recording time and is brought back to an original position in the following recovery time; a second recording beam, the other recording beam set, is irradiated while being moved substantially in synchronization with and in the same direction as the holographic recording medium 12 in the recovery time of the first recording beam and is brought back to an original position in the recording time of the first recording beam.

More in detail, the holographic recording apparatus 50 comprises: a recording medium driver 52 for driving the holographic recording medium 12 capable of forming an interference fringe of incident object and reference beams; a laser light source 54; first and second recording beam optical systems 56 and 58 for guiding respective two recording beam sets separately to the holographic recording medium 12 as recording beams, wherein one recording beam set comprises an object beam and a reference beam that are obtained by splitting a laser beam emitted from the laser light source 54; first and second spatial light modulators 60 and 62 which are disposed in the respective object optical systems 56A and 58A in the first and second recording beam optical systems 56 and 58 and modulate the object beams according to information in the recording apparatus; first and second light shutters 64 and 66 which are disposed in the respective reference optical systems 56B and 58B in the first and second recording beam optical systems 56 and 58 and can block the reference beams separately; and a controller 68 for controlling the recording medium driver 52, the first and second light shutters 64 and 66, and the first and second spatial light modulators 60 and 62.

Further, the first recording beam optical system 56 is provided with a first tracking mirror 70 that reflects the recording beam and moves the reflection point thereof.

The second recording beam optical system 58 is provided with a second tracking mirror 72 that reflects the first recording beam reflected from the first tracking mirror 70, toward the holographic recording medium 12 and moves the reflection point of the first recording beam in parallel with the moving direction of the reflection point on the first tracking mirror 70.

Figure 9:
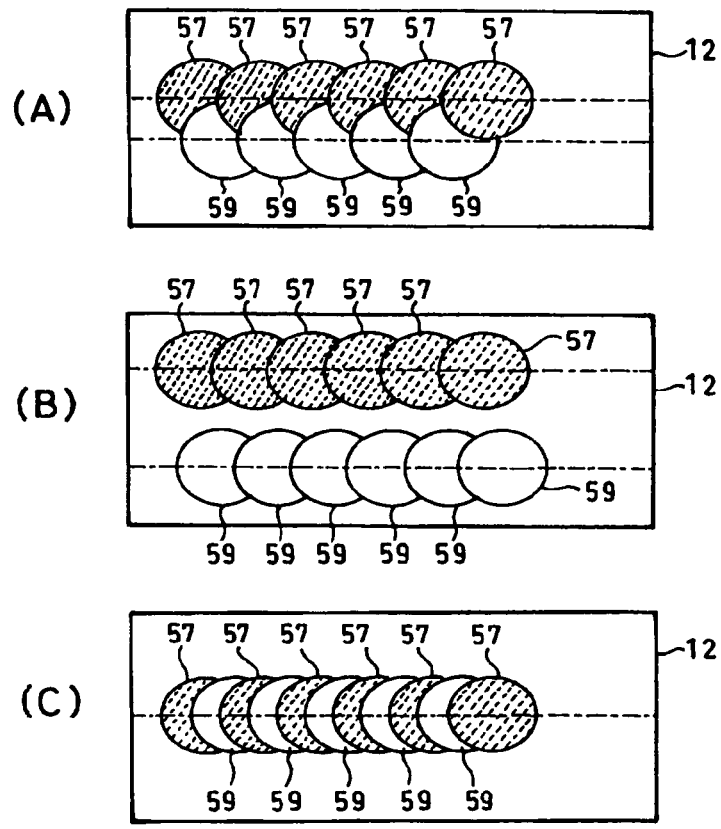
FIG. 9 includes plan views schematically illustrating recording modes of the recording beams in the fourth embodiment.

The first and second recording beam optical systems 56 and 58 are designed so that respective recording beams 57 and 59 are offset (or staggered) alternately in the direction orthogonal to the driving direction of the holographic recording medium 12 as shown in FIG. 9(A) and made incident on the holographic recording medium 12.

The controller 68 can control the movements of the first and second tracking mirrors 70 and 72. More in detail, the controller 68 controls the first and second tracking mirrors 70 and 72 so that sequential recording on the holographic recording medium can be performed by the first and second recording beams, either the first or second recording beam can be moved in the moving direction of the holographic recording medium 12 in synchronization therewith in the period of recording, and, at the same time, the other recording beam in the period of not recording can be moved in the direction opposite to the driving direction. In the meantime, the controller 68 also closes either the first or second shutter 64 or 66 corresponding to the recording beam optical system on the side of the recording beam in the period of not recording.

Figure 8:
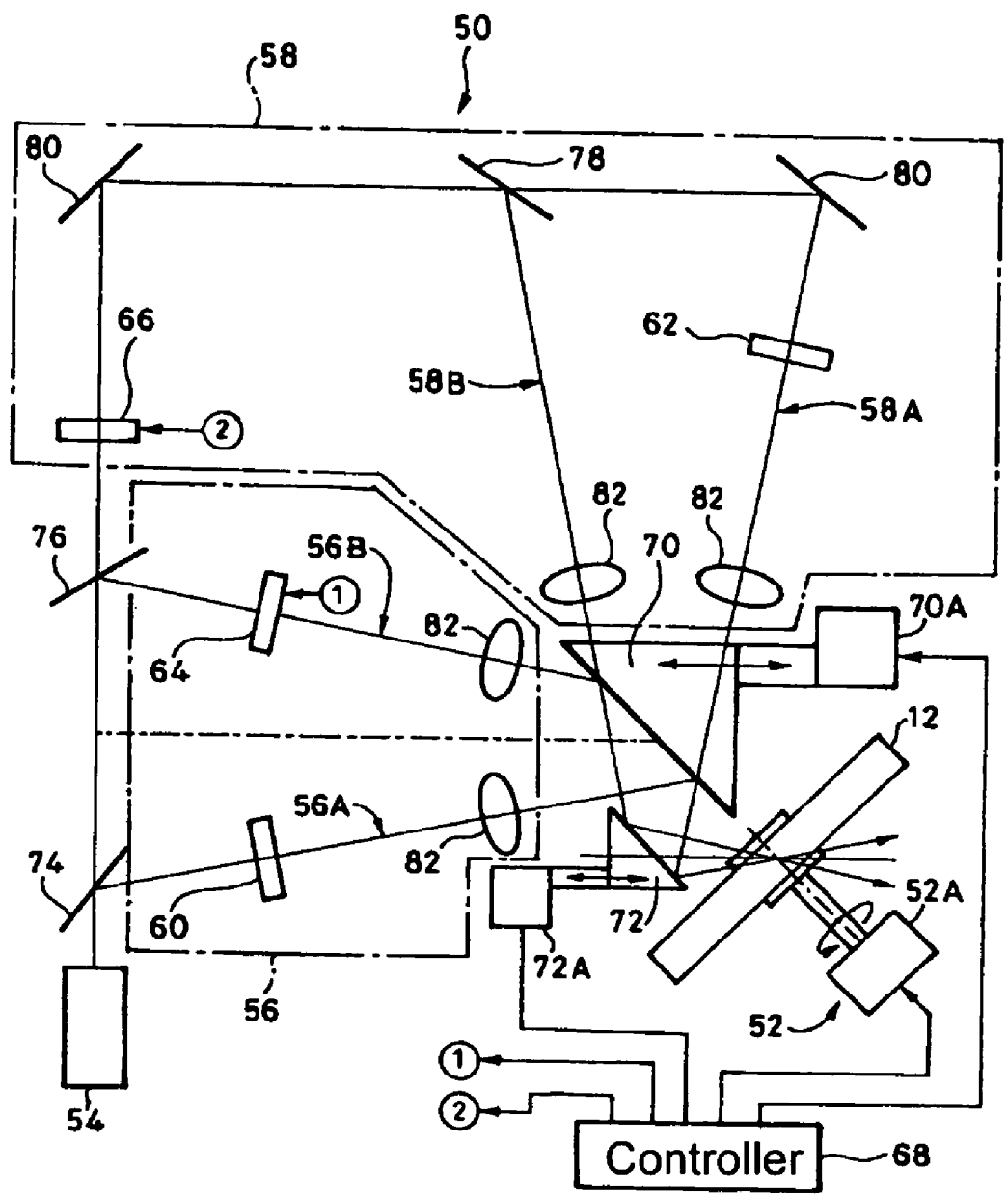
FIG. 8 is an optical system diagram including a partial side view and illustrating the holographic recording apparatus according to a fourth embodiment of the invention.

The numerals 74, 76, and 78 in FIG. 8 indicate beam splitters. The beam splitter 74 reflects part of the laser beam emitted from the laser light source 54 to form an object beam in the first recording beam optical system 56.

The beam splitter 76 reflects part of the laser beam having passed through the beam splitter 74 to form a reference beam in the first recording beam optical system 56.

The beam splitter 78 reflects part of the laser beam having passed through the beam splitter 76 to form a reference beam in the second recording beam optical system 58.

The laser beam having passed through the beam splitter 78 becomes an object beam in the second recording beam optical system 58.

The reflective surfaces of the first and second tracking mirrors 70 and 72 are disposed at an angle of 45° to the respective lines bisecting the distance between the object and reference beams of each of the first and second recording beams.

The numerals 80 and 82 indicate a mirror and a Fourier lens, respectively. The Fourier lens 82 is provided in each of the object optical systems 56A and 58A and each of the reference optical systems 56B and 58B. The reference characters 70A and 72A indicate motors for driving the respective first and second tracking mirrors 70 and 72. The reference character 52A indicates a spindle motor that constitutes a part of the recording medium driver 52.

Next, the operations of the first and second tracking mirrors 70 and 72 will be described further in detail with reference to FIGS. 10 and 11.

Figure 10:
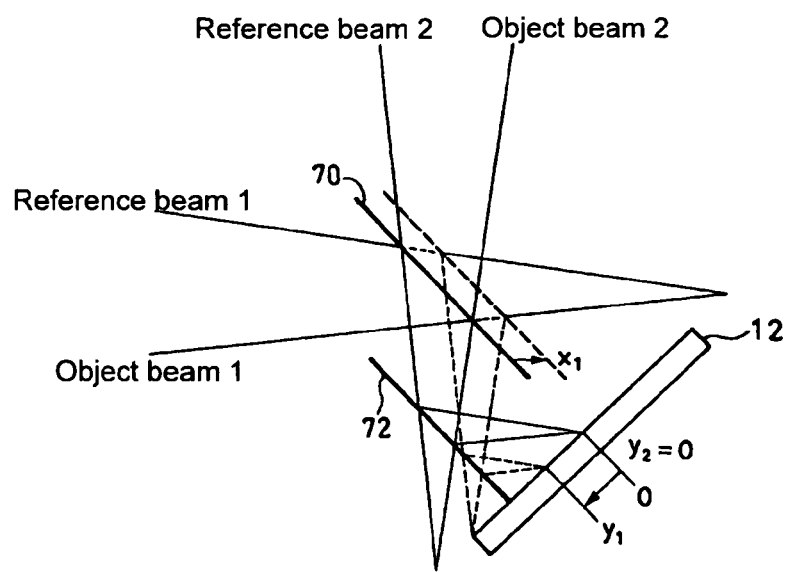
FIG. 10 is an enlarged cross-sectional view schematically illustrating the essential part of the fourth embodiment.

First, a case will be considered in which the first and second tracking mirrors 70 and 72 are at the positions shown by solid lines in FIG. 10 (defined as standard positions) and then only the first tracking mirror 70 is displaced by an amount of $X_1$ in the right direction in the drawing.

As described above, the reflective surfaces of the first and second tracking mirrors 70 and 72 are disposed at an angle of 45° to the respective lines bisecting the distance between the object and reference beams of each of the first and second recording beams. Therefore, a relationship between the displacement amount $X_1$ of the first tracking mirror 70 displaced in the right direction in FIG. 10 and the displacement amount $Y_1$ of the point where the reference beam (reference beam 1) and object beam (object beam 1) of the first recording beam intersect with each other on the holographic recording medium 12 is expressed by the equation $Y_1 = \sqrt{2} X_1$.

Figure 11:
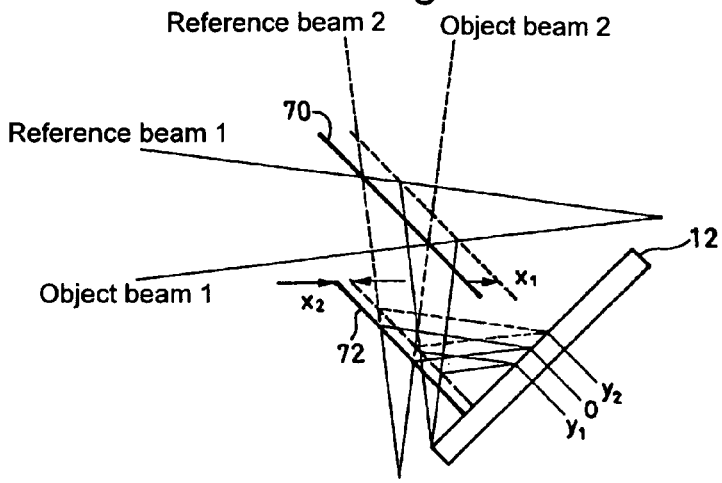
FIG. 11 is another enlarged cross-sectional view schematically illustrating the essential part of the fourth embodiment.

Another case will be considered in which the first tracking mirror 70 in FIG. 10 is displaced by the amount $X_1$ in the right direction in the drawing and at the same time, as shown in FIG. 11, the second tracking mirror 72 is displaced by an amount of $X_2$ in the direction indicated in the drawing.

Relationships among the above displacement amounts $X_1$ and $X_2$, the displacement amount $Y_1$ of the point where the object beam 1 and the reference beam 1 intersect with each other, and the displacement amount $Y_2$ of the point where the object beam (object beam 2) and reference beam (reference beam 2) of the second recording beam intersect with each other are expressed by the equations $Y_1 = \sqrt{2}(X_2 - X_1)$ and $Y_2 = \sqrt{2} X_2$.

The first tracking mirror 70 and the second tracking mirror 72 are simultaneously driven in the right direction in the drawing, whereby the intersecting points of the object and reference beams of the first and second recording beams are displaced in the directions opposite to each other from the middle point indicated by 0 (zero) in FIG. 11 and their displacement amounts $Y_1$ and $Y_2$ are given by the equations $Y_1 = \sqrt{2}(X_2 - X_1)$ and $Y_2 = \sqrt{2} X_2$.

Figure 12:
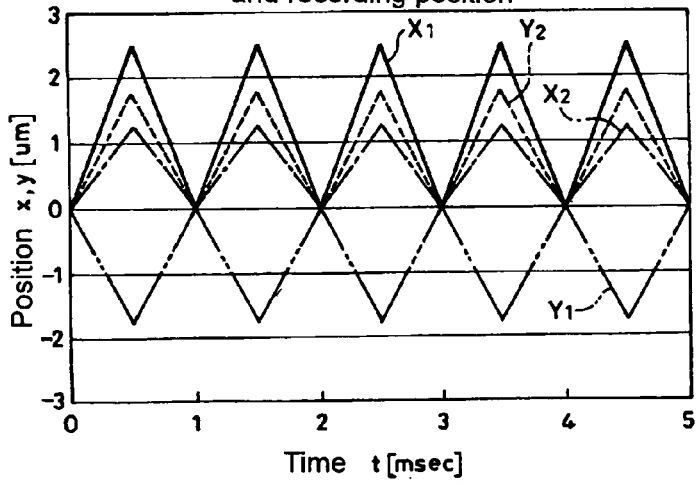
FIG. 12 is a diagram illustrating a relationship between the recording positions of the first and second beams and the positions of tracking mirrors in the fourth embodiment.

That is, as shown by the solid line $X_1$ and the dashed line $X_2$ in FIG. 12, when the tracking mirrors 70 and 72 are synchronously reciprocated by the respective amounts $X_1$ and $X_2$, the positions of the points where the object and reference beams of the first and second recording beams intersect with each other on the holographic recording medium 12 change synchronously in the direction opposite to each other as shown by the double-dashed line $Y_1$ and the broken line $Y_2$.

Accordingly, when the first recording beam is in the process of recording, the second recording beam is in the process of returning to an original position. Inversely, when the second recording beam is in the process of recording, the first recording beam is in the process of returning to an original position. This implies that there is no waste time in the recovery process of the asking servo control, so that the data transfer rate can be doubled in comparison with the conventional case in which recording and reproducing are performed by a single spot.

In the above-described embodiment, as shown in FIG. 9(A), the first and second recording beams are irradiated so that the intersecting points of their reference and object beams are positioned on the holographic recording medium 12 so as to be staggered with each other in the driving direction, but the present invention is not limited to this mode. The movement lines of the first and second recording beams may be parallel to each other with a space as shown in FIG. 9(B), or the first and second recording beams 57 and 59 may be alternately incident on the holographic recording medium 12 so as to form a single movement line as shown in FIG. 9(C).

In the above-described embodiment, there are two recording beams for which the first and second tracking mirrors 70 and 72 are provided, but the invention is not limited to this number of recording beams. The number of recording beams may be set to three or more. In the case of three recording beams, for example, each mirror is set such that: the first tracking mirror reflects only the first recording beam; the second tracking mirror reflects the first recording beam reflected by the first tracking mirror and the second recording beam; and the third tracking mirror reflects the first recording beam reflected by the first tracking mirror, the second recording beam reflected by the second tracking mirror, and the third recording beam.

Figure 13:
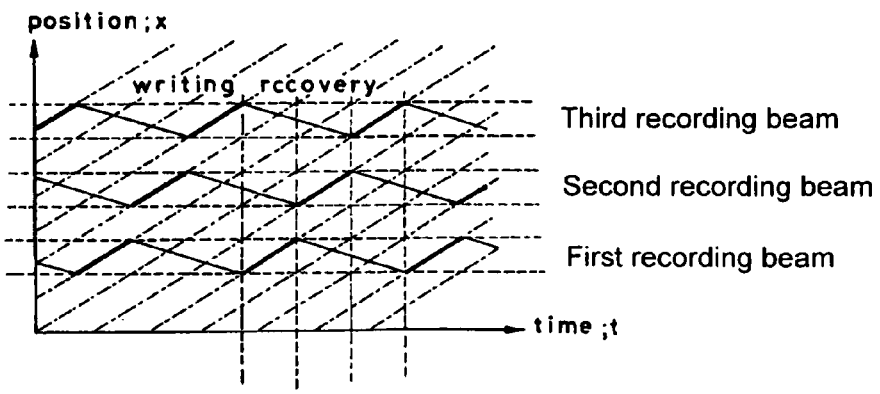
FIG. 13 is a timing chart illustrating a relationship between the recording timing of each recording beam and its return timing to an original position when three recording beams are employed.

FIG. 13 shows a relationship between time and the positions of these first to third recording beams on the holographic recording medium 12, where parts of the lines going in the upper right direction indicates the recording period and parts of the lines going in the lower right direction indicates the recovery period.

INDUSTRIAL APPLICABILITY

When recording on a holographic recording medium by using a recording beam, the time required for the asking servo control to recover can be reduced, thereby increasing the data transfer rate.

The invention claimed is:

1. A method of holographic recording, comprising the steps of:
forming a laser beam into a collimated beam having an expanded diameter and then dividing the diameter into an object beam and a reference beam;
modulating the divided object beam according to information to be recorded;
making these object and reference beams incident on the reflective surface of a rotating polygon mirror, while maintaining collimated beam shapes and being adjacent to each other, through a condenser lens having a focal point behind the reflective surface of the polygon mirror; and
moving the object and reference beams reflected on the reflective surface in a scanning direction determined by the angle change of the reflective surface, and meanwhile making the object and reference beams incident on a holographic recording medium moving in the same direction as the scanning direction with angles different from each other so as to interfere with each other within the holographic recording medium.

2. A method of holographic recording, comprising the steps of:
   driving a holographic recording medium, and meanwhile irradiating a first recording beam comprising one recording beam set from among multiple recording beam sets in a recording time while moving substantially in synchronization with and in the same direction as the holographic recording medium from an original position of a tracking mirror, the one recording beam set comprising an object beam and a reference beam forming an interference fringe on the holographic recording medium;
   bringing the first recording beam set back to the original position in a following recovery time, which is the time required for the tracking mirror to recover; and
   irradiating at least a second recording beam comprising one recording beam set from among the remaining multiple recording beam sets in the recovery time of the first recording beam while moving substantially in synchronization with and in the same direction as the holographic recording medium, wherein the recovery time for one of the first and second recording beams occurs when the other of the first and second recording beams is recording.

3. The method of holographic recording according to claim 2, wherein the multiple recording beam sets are irradiated to the holographic recording medium while being alternately offset either in the driving direction of the holographic recording medium or in the direction orthogonal to the driving direction.

4. A holographic recording apparatus comprising:
   a recording medium driver for driving a holographic recording medium capable of recording an interference fringe of incident object and reference beams;
   a laser light source;
   a beam expander for expanding a laser beam emitted from the laser light source to form a collimated beam having an expanded beam diameter;
   a collimated beam divider for dividing the beam diameter of the collimated beam expanded by the beam expander;
   a polygon mirror that is freely rotatable;
   a condenser lens having a focal point that allows an incident collimated beam to be focused behind the reflective surface of the polygon mirror;
   an object optical system and a reference optical system for guiding one of the divided collimated beams as an object beam and the other as a reference beam to the condenser lens as incident collimated beams;
   a scanning optical system for guiding the object and reference beams reflected on the reflective surface of the rotating polygon mirror to the holographic recording medium while controlling the scanning direction determined by the rotation of the polygon mirror to match the moving direction of the holographic recording medium; and
   a spatial light modulator, disposed in the object optical system, for modulating the object beam according to information to be recorded,
   wherein the object optical system and the reference optical system are configured so that the object and reference beams are integrated so as to maintain collimated beam shapes and be adjacent to each other without overlapping, and are made incident on the condenser lens with substantially the same beam shape as the collimated beam.

5. The holographic recording apparatus according to claim 4, wherein the scanning optical system is configured as a 4f-optical system.

6. The holographic recording apparatus according to claim 4, wherein the scanning optical system includes an f-θ lens which refracts the object and reference beams reflected by the polygon mirror such that when an angle between an optical axis of the polygon mirror and a central optical axis of the f-θ lens is θ, the refracted object and reference beams are parallel to the central optical axis of the f-θ lens along an optical axis whose distance from the central optical axis of the f-θ lens is proportional to the θ.

7. The holographic recording apparatus according to claim 6, wherein a relay lens is disposed between the f-θ lens in the scanning optical system and the polygon mirror, the relay lens focusing the object and reference beams reflected from the polygon mirror to the focal point of the f-θ lens.

8. A holographic recording apparatus comprising:
   a recording medium driver for driving a holographic recording medium capable of recording an interference fringe of incident object and reference beams;
   a laser light source;
   recording beam optical systems for guiding multiple recording beam sets separately to the holographic recording medium and whose number is the same as the number of recording beam sets, each of the recording beam sets comprising an object beam and a reference beam both formed by dividing a laser beam emitted from the laser light source;
   a spatial light modulator, disposed in an object optical system that guides the object beam in each of the recording beam optical systems, for modulating the object beam according to information to be recorded;
   a light shutter, disposed in a reference optical system that guides the reference beam in each of the recording beam optical systems, for blocking the reference beam independently; and
   a controller for controlling the recording medium driver, each of the light shutters, and each of the spatial light modulators,
   wherein:
   the recording beam optical systems are sequentially provided with a first tracking mirror, a second tracking mirror, and so on, the first tracking mirror reflecting a first recording beam in a first recording beam optical system from among the multiple recording beam optical systems and moving the reflection point of the first recording beam, the second tracking mirror reflecting a second recording beam, which is guided by a second recording beam optical system from among the multiple recording beam optical systems, and the first recording beam, which is reflected from the first tracking mirror, toward the holographic recording medium and moving the reflection points of the second recording beam and the first recording beam in parallel with the reflection point on the first tracking mirror;
   the recording beam optical systems each are configured so that the recording beams are alternately offset at least either in a driving direction of the holographic recording medium or in a direction orthogonal thereto and are made incident on the holographic recording medium; and
   the controller can control each of the tracking mirrors and controls each of the tracking mirrors so that sequential recording on the holographic recording medium can be performed by the recording beams and one of the recording beams can be moved in the driving direction of the holographic recording medium in synchronization therewith in the period of recording while another recording beam is moving in the direction opposite to the driving direction, and controls the light shutter in a recording beam optical system of the recording beam not in recording operation to block an optical path of the recording beam optical system.

* * * * *